United States Patent Office 3,297,523
Patented Jan. 10, 1967

3,297,523
COMPOSITIONS AND METHODS FOR
PROTECTING SEEDS
Heinz Frensch and Helmut Goebel, Frankfurt am Main, and Maximilian Czech and Kurt Hartel, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Aug. 27, 1965, Ser. No. 483,313
Claims priority, application Germany, Sept. 1, 1964, F 43,874
5 Claims. (Cl. 167—38)

The present invention relates to mercury-free seed treating agents.

For protecting against various fungus diseases, for example Tilletia caries, Fusarium disease or *Rhizoctonia solani*, seeds are nowadays generally treated with mercury-containing preparations. Because of the objectionable toxicological properties of such preparations, especially of organic mercury compounds also used for seed treatment, attempts have been made to develop mercury-free seed treating agents. The compounds and combinations hitherto proposed have the disadvantage, however, that they are effective only against part of the fungi concerned. Moreover, many of these compounds cause damages to the embryos which lead to considerable crop losses. In German Patent 1,140,392, for example, 3,3,4,4-tetrachlorotetrahydrothiophene-1,1-dioxide has been described as an effective compound for soil and seed treatment in pea cultivation (cf. also U.S. Patent 2,957,887). When this compound was used for treating cereals, for example wheat and barley, it has been found, however, that its phytotoxicity is too high in the ranges of concentration in which it is fully effective so that it cannot be used in practice as a so-called universal seed protectant.

The present invention is based on the observation that a universal seed protectant can be obtained by combining 3,3,4,4 - tetrachlorotetrahydrothiophene-1,1-dioxide with tributyltinphthalimide and/or tributyltin - para - toluenesulphonamide and/or tributyltin chloride, the effectiveness of the combination being superior to that of the individual components.

The ratio in which the 3,3,4,4-tetrachlorotetrahydrothiophene-1,1-dioxide is admixed with the above tin compound or compounds may be within the range of 1 to 6 parts by weight of thiophene compound to 1 part by weight of tin compound or compounds. The composition is applied in admixture with an inert substance.

The following examples illustrate the invention but they are not intended to limit it thereto, the parts being by weight.

EXAMPLE 1

Winter rye seed naturally infested with *Fusarium nivale* was treated with combination (A) consisting of 10 parts 3,3,4,4-tetrachlorotetrahydrothiophene-1,1-dioxide and
5 parts tributyltinphthalimide and
85 parts talcum as inert material As comparison preparations the invidual active substance components were used, comparison preparation (B) containing 15 parts 3,3,4,4-tetrachlorotetrahydrothiophene-1,1-dioxide and
85 parts talcum as inert material and comparison preparation (C) containing 15 parts tributyltinphthalimide and
85 parts talcum as inert material A commercial seed protectant (D) containing 2% of mercury was also used as comparison preparation. Each preparation was used in concentrations of 100 g., 50 g. and 25 g., respectively, for 100 kg. of seed grains.

One day after the treatment, the treated seed grains were sown in wooden boxes with sterile garden mould with 5 repetitions and caused to germinate under optimum infestation conditions in an air-conditioned room at a temperature of 5 to 8° C. and a relative atmospheric moisture of 90–100%.

The evaluation of the comparison is set forth in the following Table 1. It shows that combination (A) of the invention has a considerably higher effectiveness than the individual components (B) and (C) and exhibits the same favourable properties as mercury seed protectant (D).

Table 1

| Preparation | Percent of infestation with Fusarium with concentrations of g. of preparation for 100 kg. of seed | | | Damages to plants [1] with 100 g./100 kg. |
|---|---|---|---|---|
| | 100 g./100 kg. | 50 g./100 kg. | 25 g./100 kg. | |
| A | 0 | 0.1 | 0.9 | 0 |
| B | 2.3 | 6.5 | 12.0 | 1–2 |
| C | 11.7 | 19.6 | 24.3 | 1 |
| D | 0.05 | 0.2 | 1.3 | 0 |
| Untreated | 60.9 | 59.8 | 61.5 | |

[1] Evaluation scheme of damages to plants: 0=no damage; 5=plants died down.

EXAMPLE 2

Winter wheat strongly infested artifically with Tilletia tritici was treated with a preparation (A) consisting of a combination of 3 parts tributyltin-p-toluenesulphonamide and
10 parts 3,3,4,4-tetrachlorotetrahydrothiophene-1,1-dioxide and
87 parts talcum as inert material For comparison there were used a preparation (B) containing 13 parts 3,3,4,4-tetrachlorotetrahydrothiophene-1,1-dioxide alone and
87 parts talcum as inert material and a preparation (C) containing 13 parts tributyltin-p-toluenesulphonamide and
87 parts talcum as inert material A commercial seed protectant (D) containing 2% of mercury was also used as comparison preparation.

The preparations were used in concentrations of 100 g., 50 g. and 25 g., respectively, for 100 kg. of seed grains.

One day after the treatment, the treated wheat was sown in lots of 2 m.[2] each with 5 repetitions. On harvesting, the number of sound and of infested ears was determined and compared with the figures obtained with untreated control plants.

As is evident from the following Table 2, combination (A) of the invention is considerably more effective than the individual components (B) and (C) and is, in the low concentrations, more effective than mercury seed protectant (D).

*Table 2*

| Preparation | Percent of infestation with Tilletia tritici with concentrations of g. of preparation for 100 kg. of seed | | |
|---|---|---|---|
| | 100 g./100 kg. | 50 g./100 kg. | 25 g./100 kg. |
| A | 0 | 0.1 | 0.8 |
| B | 9.8 | 13.7 | 18.4 |
| C | 6.7 | 11.2 | 23.1 |
| D | 0.1 | 0.8 | 3.3 |
| Untreated | 63 | 66.3 | 68.4 |

EXAMPLE 3

Bean seeds strongly infested with Colletotrichum was treated with a preparation (A) containing as active substance a combination of 15 parts 3,3,4,4-tetrachlorotetrahydrothiophene-1,1-dioxide and
3 parts tributyltin chloride in addition to
82 parts talcum as inert material For comparison there were used a preparation (B) containing as active substance 18 parts 3,3,4,4-tetrachlorotetrahydrothiophene-1,1-dioxide alone in addition to
82 parts talcum as inert material and a preparation (C) containing as active substance 18 parts tributyltin chloride alone in addition to
82 parts talcum as inert material A commercial seed protectant (D) containing 2% of mercury was also used as comparison preparation.

The preparations were used in concentrations of 200 g., 100 g. and 50 g., respectively, for 100 kg. of seed grains.

One day after the treatment, the treated seed grains were sown in dishes with sterile garden mould and after germination the extent of infestation was determined.

As results from the following Table 3, active substance combination (A) of the invention is distinctly more effective than individual components (B) and (C). The effectiveness of the combination of 3,3,4,4-tetrachlorotetrahydrothiophene-1,1-dioxide with the organic tin compound is about equal to that of the commercial mercury seed protectant (D).

*Table 3*

| Preparation | Percent of infestation with Colletotrichum with concentrations of g. of preparation for 100 kg. of seed | | |
|---|---|---|---|
| | 200 g./100 kg. | 100 g./100 kg. | 50 g./100 kg. |
| A | 0 | 1.8 | 4.5 |
| B | 7.4 | 12.3 | 18.5 |
| C | 4.7 | 9.5 | 15.9 |
| D | 0.2 | 2.3 | 7.9 |
| Untreated | 30.6 | 32.8 | 38.4 |

We claim:
1. Seed protectants containing as active substance a mixture of 3,3,4,4 - tetrachlorotetrahydrothiophene - 1,1-dioxide—in a ratio within the range of 1:1 to 6:1—with tributyltinphthalimide, tributyltin-p-toluenesulphonamide, tributyltin chloride or with their mixtures, in conjunction with an inert carrier material.
2. A method of protecting seeds comprising applying to said seeds a preparation as claimed in claim 1.
3. Composition as defined in claim 1 wherein the active substance is a mixture of 3,3,4,4 - tetrachlorotetrahydrothiophene - 1,1 - dioxide with tributyltinphthalimide.
4. Composition as defined in claim 1 wherein the active substance is a mixture of 3,3,4,4-tetrachlorotetrahydrothiophene - 1,1 - dioxide with tributyltin-p-toluenesulfonamide.
5. Composition as defined in claim 1 wherein the active substance is a mixture of 3,3,4,4 - tetrachlorotetrahydrothiophene - 1,1 - dioxide with tributyltinchloride.

No references cited.

JULIAN S. LEVITT, *Primary Examiner.*

S. J. FRIEDMAN, *Assistant Examiner.*